(12) United States Patent
Nito (10) Patent No.: US 12,131,594 B2
(45) Date of Patent: Oct. 29, 2024

(54) EVALUATION DEVICE

(71) Applicant: Yazaki Corporation, Tokyo (JP)

(72) Inventor: Chihiro Nito, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 350 days.

(21) Appl. No.: 17/685,367

(22) Filed: Mar. 2, 2022

(65) Prior Publication Data

US 2022/0292890 A1 Sep. 15, 2022

(30) Foreign Application Priority Data

Mar. 10, 2021 (JP) ................................. 2021-037888

(51) Int. Cl.
*G07C 5/08* (2006.01)
*B60K 35/00* (2024.01)
*G06F 21/57* (2013.01)

(52) U.S. Cl.
CPC ............ *G07C 5/0808* (2013.01); *B60K 35/00* (2013.01); *G06F 21/577* (2013.01); *G07C 5/0825* (2013.01)

(58) Field of Classification Search
CPC .. G06F 11/0766; G06F 11/36; G06F 11/3672; G06F 21/57; G06F 21/577; G06F 2221/034; G01N 21/8851; G01N 21/95607; H04L 63/1433; H04L 43/50
See application file for complete search history.

(56) References Cited

U.S. PATENT DOCUMENTS

| | | | |
|---|---|---|---|
| 2010/0283858 A1* | 11/2010 | Katchan | G06F 11/2221 348/189 |
| 2014/0047275 A1 | 2/2014 | Eddington | |
| 2018/0203226 A1* | 7/2018 | Tomioka | G09G 3/006 |
| 2019/0141074 A1 | 5/2019 | Oka | |
| 2021/0010950 A1 | 1/2021 | Kito et al. | |

FOREIGN PATENT DOCUMENTS

JP 2012175183 A * 9/2012
JP 2017-214049 A 12/2017

OTHER PUBLICATIONS

Machine translation of JP-2012175183-A (Year: 2012).*
(Continued)

*Primary Examiner* — Rami Khatib
*Assistant Examiner* — Caitlin R McCleary
(74) *Attorney, Agent, or Firm* — Kenealy Vaidya LLP (57) ABSTRACT

In an evaluation device, first and second signal controllers transmit test data for executing normal operation of an operating section to a controller of a meter device. A fuzzing data transmitter transmits fuzzing data being improper data differing from the data for executing the normal operation, to the controller. An output status variation detector detects variation from an output status in the normal operation being a visually recognizable output status in the normal operation when the fuzzing data transmitter transmits the fuzzing data to the controller with the controller normally operating the operating section on the basis of the test data. An evaluator evaluates the vulnerability of the controller on the basis of the variation from the output status in the normal operation detected by the output status variation detector.

4 Claims, 9 Drawing Sheets

(56) References Cited

OTHER PUBLICATIONS

Ryosuke Taniguchi et al,; "Anomaly Detection Method Utilizing Side-Channel Information for Fuzzing to Automotive ECUs"; 2020 Code and Information Security Symposium Proceedings [Online]; Proceedings of 2020 Symposium on Cryptography and Information Security; Japan; general incorporated foundation Institute of Electronics, Information and Communication Engineers; Jan. 21, 2020; p. 1-p. 8.

* cited by examiner

EVALUATION DEVICE

CROSS-REFERENCE TO RELATED APPLICATION(S)

The present application claims priority to and incorporates by reference the entire contents of Japanese Patent Application No. 2021-037888 filed in Japan on Mar. 10, 2021.

BACKGROUND OF THE INVENTION

1. Field of the Invention

The present invention relates to evaluation devices.

2. Description of the Related Art

As an evaluation device in the related art, for example, Japanese Patent Application Laid-open No. 2017-214049 discloses a security test system transmitting a random test signal (fuzzing signal) including an invalid signal to an object to be tested and detecting an abnormality in the object to be tested. This security test system includes, for example, a test signal transmission portion transmitting the fuzzing signal to a vehicle-mounted ECU to be tested, a process information acquisition portion acquiring an output signal output from the vehicle-mounted ECU after the transmission of the fuzzing signal to the vehicle-mounted ECU, and an abnormality detection portion detecting an abnormality in the vehicle-mounted ECU on the basis of the output signal acquired by the process information acquisition portion and a reference signal.

It is desired that the aforementioned security test system described in Japanese Patent Application Laid-open No. 2017-214049 more comprehensively evaluate the vulnerability of various objects to be tested.

SUMMARY OF THE INVENTION

In light of the foregoing, an object of the present invention is to provide an evaluation device that can properly evaluate the vulnerability of a vehicle-mounted device.

In order to solve the above mentioned problem and achieve the object, an evaluation device according to one aspect of the present invention includes a test data transmitter configured to transmit test data to a controller of a vehicle-mounted device including an operating section and the controller configured to control the operating section, the test data executing normal operation of the operating section; a fuzzing data transmitter configured to transmit fuzzing data to the controller, the fuzzing data being improper data differing from the data executing the normal operation; an output status variation detector configured to detect variation from an output status in the normal operation upon transmission of the fuzzing data to the controller by the fuzzing data transmitter with the controller executing the normal operation of the operating section based on the test data transmitted by the test data transmitter, the output status in the normal operation being a visually recognizable output status in the normal operation; and an evaluator configured to evaluate vulnerability of the controller based on the variation from the output status in the normal operation, the variation being detected by the output status variation detector.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A mode (embodiment) for implementing the present invention will be described in detail with reference to the drawings. Contents described in the following embodiment should not be construed to limit the present invention. Constituents described below include constituents that can be easily conceived by those skilled in the art and that are substantially the same. Furthermore, configurations described below may be combined as appropriate. Moreover, various omissions, substitutions, or modifications of the configurations may be made without departing from the scope of the present invention.

Embodiment

An evaluation device 1 according to an embodiment will be described with reference to the drawings. The evaluation device 1 can be a computer that evaluates the vulnerability of a meter device 100 being a device mounted in a vehicle. Herein, the vulnerability refers to a malfunction (security hole) of a computer program in a computer operating with the computer program. The evaluation device 1 evaluates the vulnerability of the meter device 100. The meter device 100 will be described below first, and then the evaluation device 1 will be described.

Figure 1:
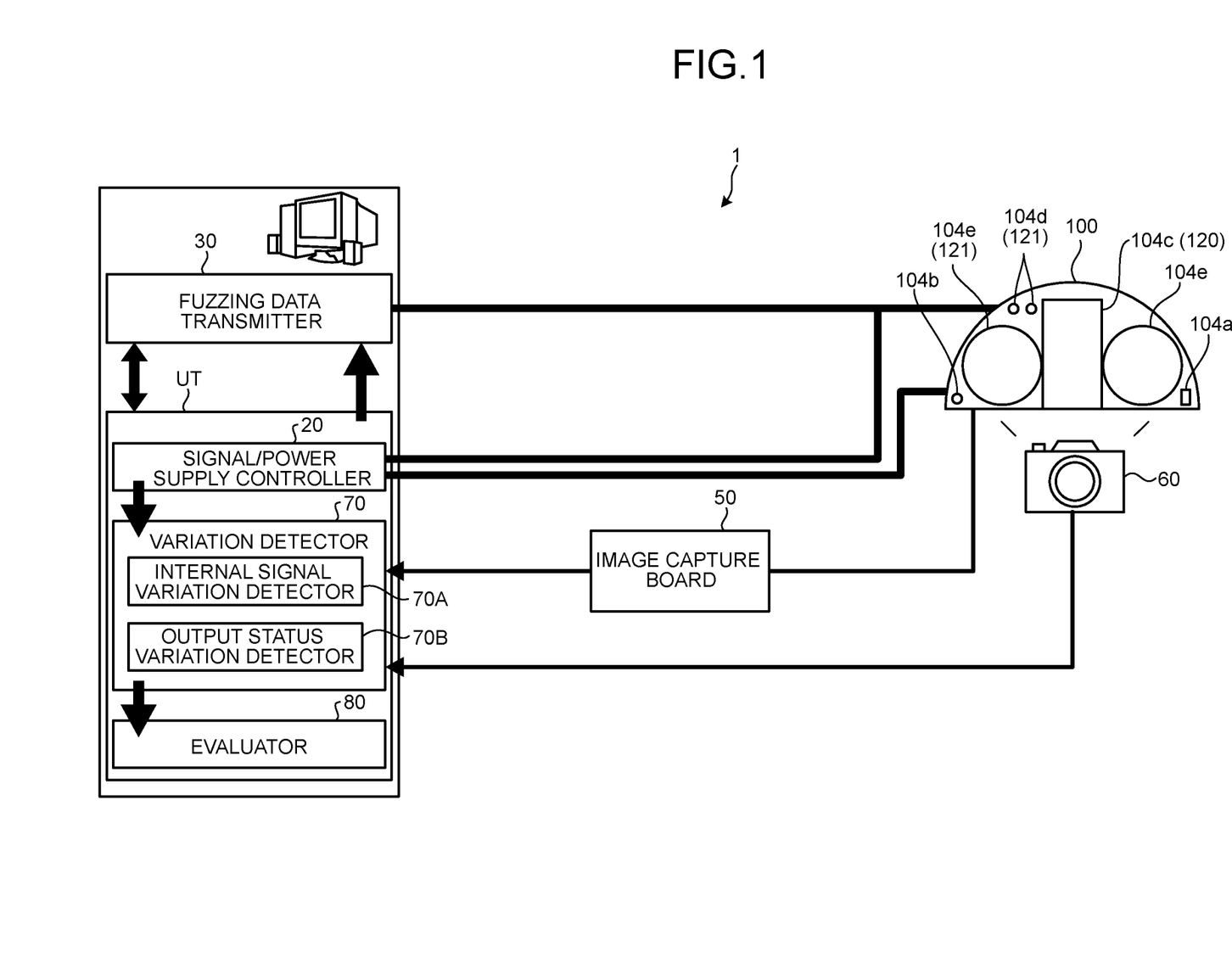
FIG. 1 is a schematic view illustrating an example configuration of an evaluation device according to an embodiment.
Figure 2:
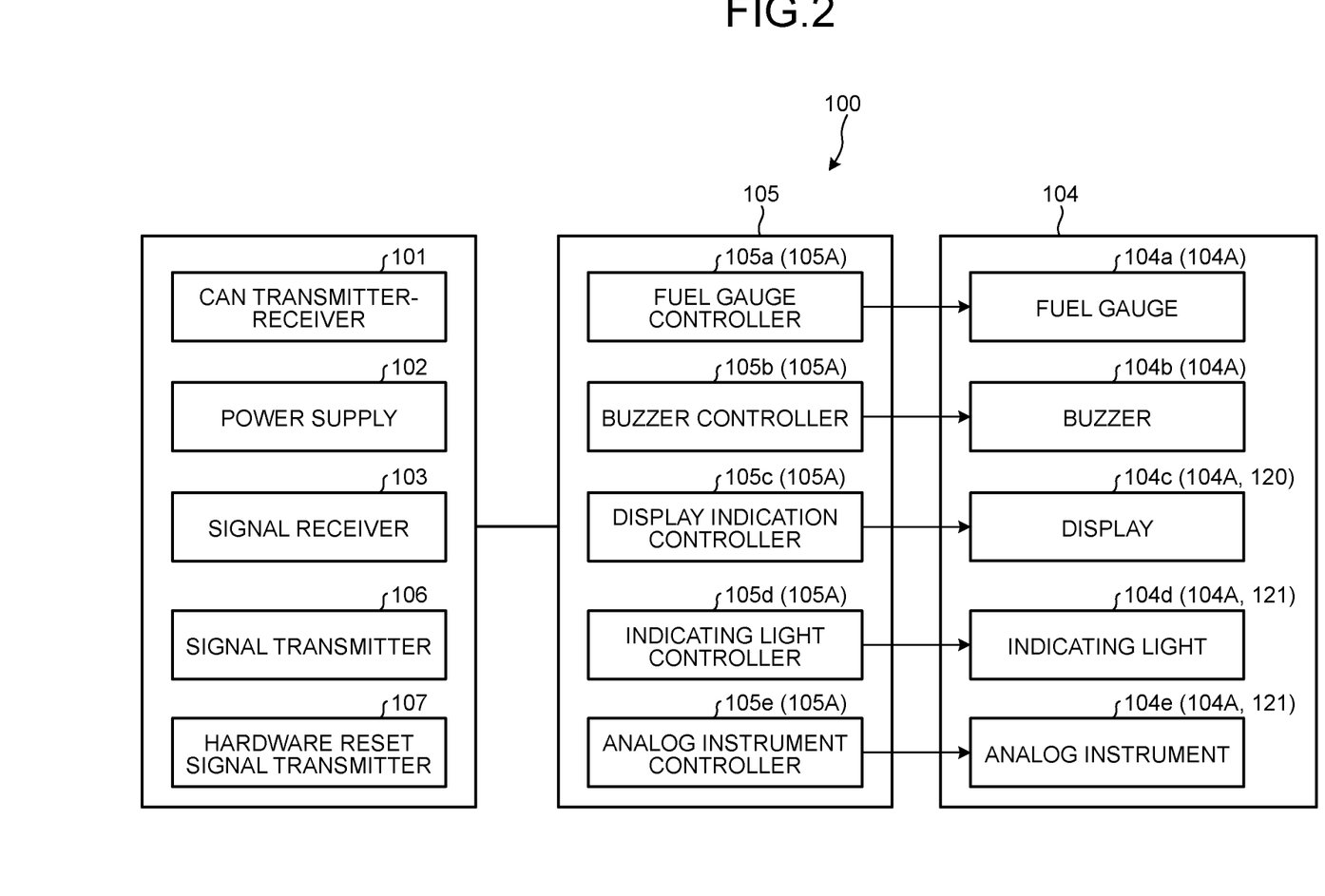
FIG. 2 is a block diagram illustrating an example configuration of a meter device according to the embodiment.

The meter device 100 indicates information relating to the vehicle. As illustrated in FIGS. 1 and 2, the meter device 100 includes, for example, a CAN transmitter-receiver 101, a power supply 102, a signal receiver 103, an operating section 104, a controller 105, a signal transmitter 106, and a hardware reset signal transmitter 107. The CAN transmitter-receiver 101 is connected to the evaluation device 1 via a twisted pair cable (twisted wire), and transmits and receives a controller area network (CAN) signal transmitted from the evaluation device 1. The CAN transmitter-receiver 101 transmits the received CAN signal to the controller 105. The power supply 102 functions as a power supply supplying power to each constituent of the meter device 100. The signal receiver 103 is connected to the evaluation device 1 via an electric wire and receives a signal transmitted from the evaluation device 1. The signal receiver 103 outputs the received signal to the controller 105. The signal transmitter 106 is connected to the evaluation device 1 via an electric wire and transmits an operation signal D4 to the evaluation device 1. The hardware reset signal transmitter 107 is connected to the evaluation device 1 via an electric wire and transmits a hardware reset signal D7 to the evaluation device 1.

The operating section 104 includes a plurality of devices 104A. The devices 104A correspond to, for example, a fuel gauge 104a, a buzzer 104b, a display 104c, an indicating light 104d, and an analog instrument 104e. The fuel gauge 104a indicates the amount of remaining fuel. The buzzer 104b outputs an alarm and the like. The display 104c displays an image and composes a first indicator 120. The display 104c includes, for example, a liquid crystal panel displaying the image and a backlight disposed on the back surface of the liquid crystal panel and emitting light. The display 104c emits light from the backlight toward the liquid crystal panel, thereby displaying the image on the liquid crystal panel. Note that the display 104c is not limited to a liquid crystal display, and, for example, an organic EL display or other display may be adopted. The indicating light 104d indicates information by lighting and composes a second indicator 121. The indicating light 104d, for example, emits light with an emitter, such as an LED, toward a meter panel on which symbols indicating warning and the like are formed, from a back surface side, thereby indicating information indicating the warning and the like. The indicating light 104d provides indication by lighting, for example, in a case where a seat belt is not worn, a case where the amount of remaining fuel is small, and the like. The analog instrument 104e indicates a vehicle speed, an engine speed, and the like, and composes the second indicator 121. The analog instrument 104e includes, for example, scale plates on which numerals are provided, pointers pointing out numerals on the scale plates, and drivers turning the pointers. The analog instrument 104e turns the pointers relative to the scale plates, thereby indicating the vehicle speed and the like.

The controller 105 is a circuit implementing various processing functions in the meter device 100. The controller 105 executes various computer programs stored in a storage and operates the operating section 104 through the operation of the computer programs to execute various types of processing for implementing various functions. The controller 105 transmits a control signal D1 to the operating section 104 to control the operating section 104. The controller 105 includes a plurality of processing function sections 105A. The processing function sections 105A correspond to, for example, a fuel gauge controller 105a, a buzzer controller 105b, a display indication controller 105c, an indicating light controller 105d, and an analog instrument controller 105e.

The fuel gauge controller 105a controls the fuel gauge 104a. The fuel gauge controller 105a, for example, generates an operation signal D4 on the basis of a received signal received from the CAN transmitter-receiver 101 and transmits the operation signal D4 to the fuel gauge 104a to control the fuel gauge 104a.

The buzzer controller 105b controls the buzzer 104b. The buzzer controller 105b, for example, generates an operation signal D4 on the basis of a received signal received from the signal receiver 103 and transmits the operation signal D4 to the buzzer 104b to control the buzzer 104b.

The display indication controller 105c controls the display 104c. The display indication controller 105c controls the display 104c on the basis of received signals received from the CAN transmitter-receiver 101 and the signal receiver 103. The display indication controller 105c, for example, controls the display 104c so that an image stored in a storage (not illustrated) of the meter device 100 is displayed, on the basis of the received signals.

The display indication controller 105c, for example, transmits an image signal D5 for displaying the image stored in the storage on the display 104c, to the display 104c. Herein, the image signal D5 indicates a pixel value of each pixel composing the image. When transmitting the image signal D5 to the display 104c, the display indication controller 105c also transmits a synchronizing signal D6 to the display 104c. Herein, the synchronizing signal D6 includes a horizontal synchronizing signal defining horizontal synchronization of the image and a vertical synchronizing signal defining vertical synchronization of the image.

The indicating light controller 105d controls the indicating light 104d on the basis of a received signal received from the CAN transmitter-receiver 101. The indicating light controller 105d, for example, transmits an indication control signal D2 to the emitter of the indicating light 104d and exercises such control that light is emitted from the emitter to indicate information indicating the warning and the like, on the basis of the received signal.

The analog instrument controller 105e controls the analog instrument 104e on the basis of a received signal received from the CAN transmitter-receiver 101. The analog instrument controller 105e, for example, transmits a drive control signal D3 to the drivers of the analog instrument 104e and exercises such control that the pointers are turned by the drivers to point out numerals on the scale plates, on the basis of the received signal.

Figure 3:
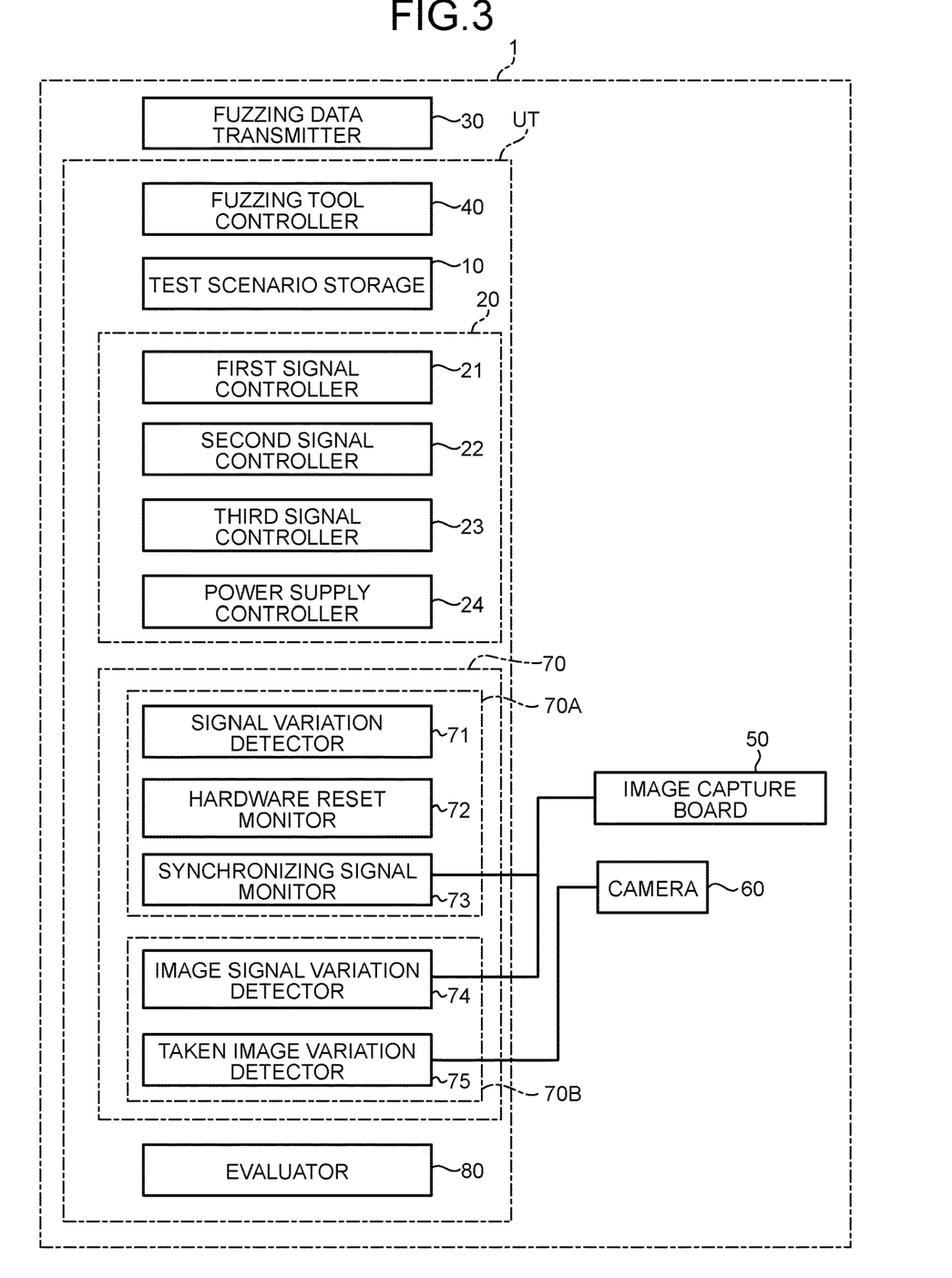
FIG. 3 is a block diagram illustrating the example configuration of the evaluation device according to the embodiment.

Next, the evaluation device 1 evaluating the vulnerability of the above-described meter device 100 will be described. As illustrated in FIGS. 1 and 3, the evaluation device 1 includes a test scenario storage 10, a signal/power supply controller 20, a fuzzing data transmitter 30, a fuzzing tool controller 40, an image capture board 50, a camera 60 being an imager, a variation detector 70, and an evaluator 80. Note that the test scenario storage 10, the signal/power supply controller 20, the fuzzing tool controller 40, the variation detector 70, and the evaluator 80 compose an evaluation unit UT.

The test scenario storage 10 stores therein test data for executing normal operation of the operating section 104 of the meter device 100. Herein, the normal operation refers to the operation of the operating section 104 within an expected range and can also be called usual operation. That is, the normal operation refers to the operation of the operating section 104 by the controller 105 according to preliminarily designed specifications. The test data stored in the test scenario storage 10 contains, for example, data for normally operating the operating section 104, such as the fuel gauge 104a, the buzzer 104b, the display 104c, the indicating light 104d, and the analog instrument 104e.

The signal/power supply controller 20 controls the transmission and the reception of signals to and from the meter device 100 and also controls the power supply 102 of the meter device 100. The signal/power supply controller 20 includes a first signal controller 21 being a test data transmitter, a second signal controller 22 being the test data transmitter, a third signal controller 23, and a power supply controller 24.

Figure 4:
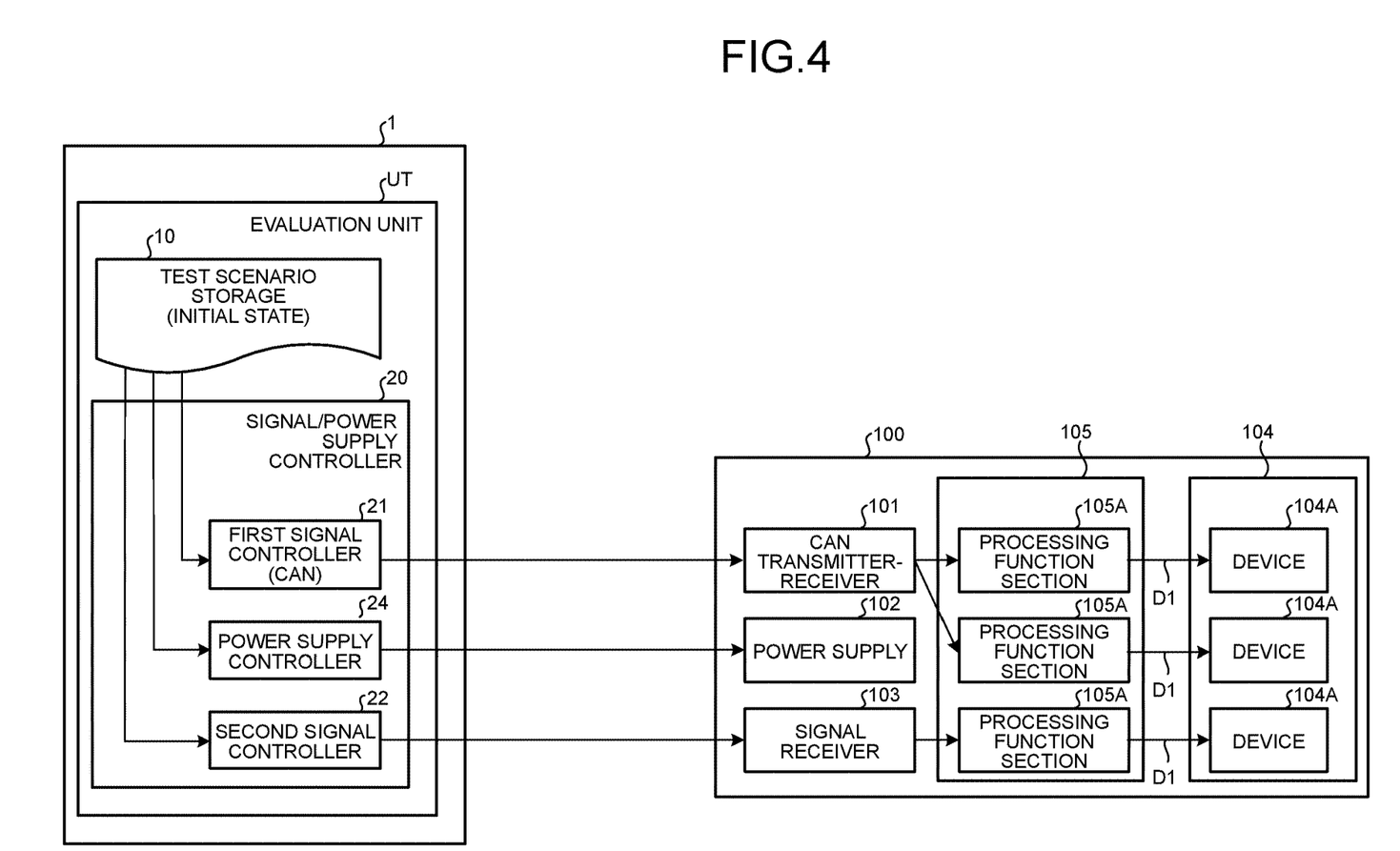
FIG. 4 is a block diagram illustrating an example of transmitting test data according to the embodiment.

The first signal controller 21 controls the transmission of the CAN signal. As illustrated in FIG. 4 and the like, the first signal controller 21 is connected to the CAN transmitter-receiver 101 of the meter device 100 via the twisted pair cable. The first signal controller 21 transmits the test data stored in the test scenario storage 10 to the CAN transmitter-receiver 101 of the meter device 100.

The second signal controller 22 controls the transmission of a signal other than the CAN signal. The second signal controller 22 is connected to the signal receiver 103 of the meter device 100 via the electric wire. The second signal controller 22 transmits the test data stored in the test scenario storage 10 to the signal receiver 103 of the meter device 100.

The third signal controller 23 controls the reception of signals other than the CAN signal. The third signal controller 23 is connected to the signal transmitter 106 and the hardware reset signal transmitter 107 of the meter device 100 via the electric wires (see FIGS. 6 and 7). The third signal controller 23 receives, from the signal transmitter 106, the operation signal D4 output from the controller 105 to the operating section 104, and receives, from the hardware reset signal transmitter 107, the hardware reset signal D7 indicating that hardware of the meter device 100 is reset (for example, restarted).

The power supply controller 24 controls the power supply 102 of the meter device 100. The power supply controller 24 applies a voltage (for example, ON: 12 V, OFF: 0 V) to the power supply 102 of the meter device 100 to turn on the power supply 102. Furthermore, the power supply controller 24 transmits a turn-off signal to the power supply 102 of the meter device 100 to turn off the power supply 102.

The fuzzing data transmitter 30 transmits fuzzing data. Herein, the fuzzing data refers to improper data differing from the data (test data) for executing the normal operation of the operating section 104. That is, the fuzzing data refers to data beyond the expectation of a designer who has designed the meter device 100, for example, data containing an abnormal value, an abnormal data structure, or the like. The fuzzing data transmitter 30 is connected to the CAN transmitter-receiver 101 of the meter device 100 and transmits the fuzzing data to the CAN transmitter-receiver 101.

The fuzzing tool controller 40 controls the fuzzing data transmitter 30. The fuzzing tool controller 40 transmits a control command to the fuzzing data transmitter 30, so that the fuzzing data transmitter 30 transmits the fuzzing data. Furthermore, the fuzzing tool controller 40 transmits a control command to the fuzzing data transmitter 30, so that the fuzzing data transmitter 30 stops the transmission of the fuzzing data. The fuzzing tool controller 40 receives a transmission state of the fuzzing data from the fuzzing data transmitter 30.

The image capture board 50 acquires the image signal D5 and the synchronizing signal D6. The image capture board 50 acquires the image signal D5 transmitted from the display indication controller 105*c* to the display 104*c* and transmits the acquired image signal D5 to an image signal variation detector 74, which will be described later. At this time, for example, instead of transmitting all the acquired image signals D5 to the image signal variation detector 74, the image capture board 50 transmits the image signal D5 to the image signal variation detector 74 only if the acquired image signal D5 varies. With this, the image capture board 50 can reduce the volume of data transmitted to the image signal variation detector 74. Furthermore, the image capture board 50 acquires the synchronizing signal D6 transmitted from the display indication controller 105*c* to the display 104*c* and transmits the acquired synchronizing signal D6 to a synchronizing signal monitor 73, which will be described later. At this time, for example, instead of transmitting all the acquired synchronizing signals D6 to the synchronizing signal monitor 73, the image capture board 50 transmits the synchronizing signal D6 to the synchronizing signal monitor 73 only if the acquired synchronizing signal D6 varies. With this, the image capture board 50 can reduce the volume of data transmitted to the synchronizing signal monitor 73.

The camera 60 takes an image. The camera 60 is disposed in a position where the indicating light 104*d* and the analog instrument 104*e* can be imaged. The camera 60 images the indicating light 104*d* and the analog instrument 104*e* and transmits the taken image (moving image) to a taken image variation detector 75, which will be described later.

The variation detector 70 detects variation in operation of the meter device 100. The variation detector 70 includes an internal signal variation detector 70A and an output status variation detector 70B. The internal signal variation detector 70A detects variation of internal signals (operation signal D4, synchronizing signal D6, and hardware reset signal D7) output from the controller 105 in the normal operation of the operating section 104, from the internal signals in the normal operation, when the fuzzing data transmitter 30 transmits the fuzzing data to the controller 105 with the controller 105 normally operating the operating section 104 on the basis of the test data transmitted by the first signal controller 21 and the second signal controller 22, for example. The output status variation detector 70B detects variation from an output status in the normal operation being a visually recognizable output status in the normal operation of the operating section 104 when the fuzzing data transmitter 30 transmits the fuzzing data to the controller 105 with the controller 105 normally operating the operating section 104 on the basis of the test data transmitted by the first signal controller 21 and the second signal controller 22, for example. The visually recognizable output status includes a first output status including information relating to the vehicle (for example, the vehicle speed and warning) and a second output status indicating turning-on or turning-off of a vehicle headlight and the indicating light 104*d*, such as an interior light.

The internal signal variation detector 70A includes a signal variation detector 71, a hardware reset monitor 72, and the synchronizing signal monitor 73.

The signal variation detector 71 detects variation of the operation signal D4. The signal variation detector 71 detects variation from the operation signal D4 output from the controller 105 to the operating section 104 (such as the fuel gauge 104*a* and the buzzer 104*b*) in the normal operation of the operating section 104. This operation signal D4 differs from the image signal D5 and the signal for controlling the indicating light 104*d* or the analog instrument 104*e*, and is, for example, a resistance value indicating a remaining amount of the fuel gauge 104*a*, a frequency indicating the pitch of the buzzer 104*b*, a voltage indicating the sound volume of the buzzer 104*b*, and the like. If detecting variation of the operation signal D4, the signal variation detector 71 transmits a signal indicating the variation of the operation signal D4 to the evaluator 80.

The hardware reset monitor 72 monitors the hardware reset signal D7. If receiving the hardware reset signal D7 (voltage application), the hardware reset monitor 72 transmits a signal indicating that the hardware of the meter device 100 has been reset (for example, restarted) to the evaluator 80.

The synchronizing signal monitor 73 detects variation of the synchronizing signal D6 of the image. If receiving the synchronizing signal D6 that has varied from the image capture board 50, the synchronizing signal monitor 73 transmits a signal indicating that the synchronizing signal D6 has varied, to the evaluator 80.

The output status variation detector 70B includes the image signal variation detector 74 and the taken image variation detector 75.

The image signal variation detector 74 detects variation of the image signal D5. This image signal D5 is transmitted from the display indication controller 105c to the display 104c. The image signal variation detector 74, for example, detects variation from the output status in the normal operation being the visually recognizable output status in the normal operation of the operating section 104 on the basis of variation of the image signal D5 for displaying the output status in the normal operation on the display 104c. If detecting variation of the output status in the normal operation, the image signal variation detector 74 transmits a signal indicating that the output status in the normal operation has varied, to the evaluator 80.

The taken image variation detector 75 detects variation of the taken image. The taken image variation detector 75 detects variation from the output status in the normal operation, from variation of the taken image obtained by imaging the output status in the normal operation of the indicating light 104d or the analog instrument 104e by the camera 60. If detecting variation from the output status in the normal operation, the taken image variation detector 75 transmits a signal indicating that the output status in the normal operation has varied, to the evaluator 80.

The evaluator 80 evaluates vulnerability. The evaluator 80 evaluates the vulnerability of the controller 105 on the basis of the variation from the output status in the normal operation or the internal signal in the normal operation detected by the variation detector 70. For example, if the variation detector 70 detects no variation from the output status in the normal operation, the evaluator 80 evaluates the controller 105 as having no vulnerability, and if the variation detector 70 detects variation from the output status in the normal operation, the evaluator 80 evaluates the controller 105 as having vulnerability. The evaluator 80 then generates an evaluation report on the basis of whether vulnerability exists.

Next, an example operation of the evaluation device 1 will be described in detail. As illustrated in FIG. 4, the evaluation device 1 applies a voltage (for example, ON: 12 V, OFF: 0 V) to the power supply 102 of the meter device 100 to turn on the power supply 102. Furthermore, the evaluation device 1 transmits test data for executing the normal operation of the operating section 104 of the meter device 100, to the meter device 100. For example, in the evaluation device 1, the first signal controller 21 transmits the test data stored in the test scenario storage 10 to the CAN transmitter-receiver 101 of the meter device 100. The CAN transmitter-receiver 101 of the meter device 100 transmits the test data transmitted from the first signal controller 21, to the controller 105. The controller 105 transmits control signals D1 to the operating section 104 to control the operating section 104 on the basis of the test data. Similarly, the second signal controller 22 transmits the test data stored in the test scenario storage 10 to the signal receiver 103 of the meter device 100. The signal receiver 103 of the meter device 100 transmits the test data transmitted from the second signal controller 22, to the controller 105. The controller 105 transmits a control signal D1 to the operating section 104 to control the operating section 104 on the basis of the test data. In this way, the evaluation device 1 transmits the test data for executing the normal operation of the operating section 104 to the controller 105 of the meter device 100 so that the operating section 104 of the meter device 100 normally operates.

Figure 5:
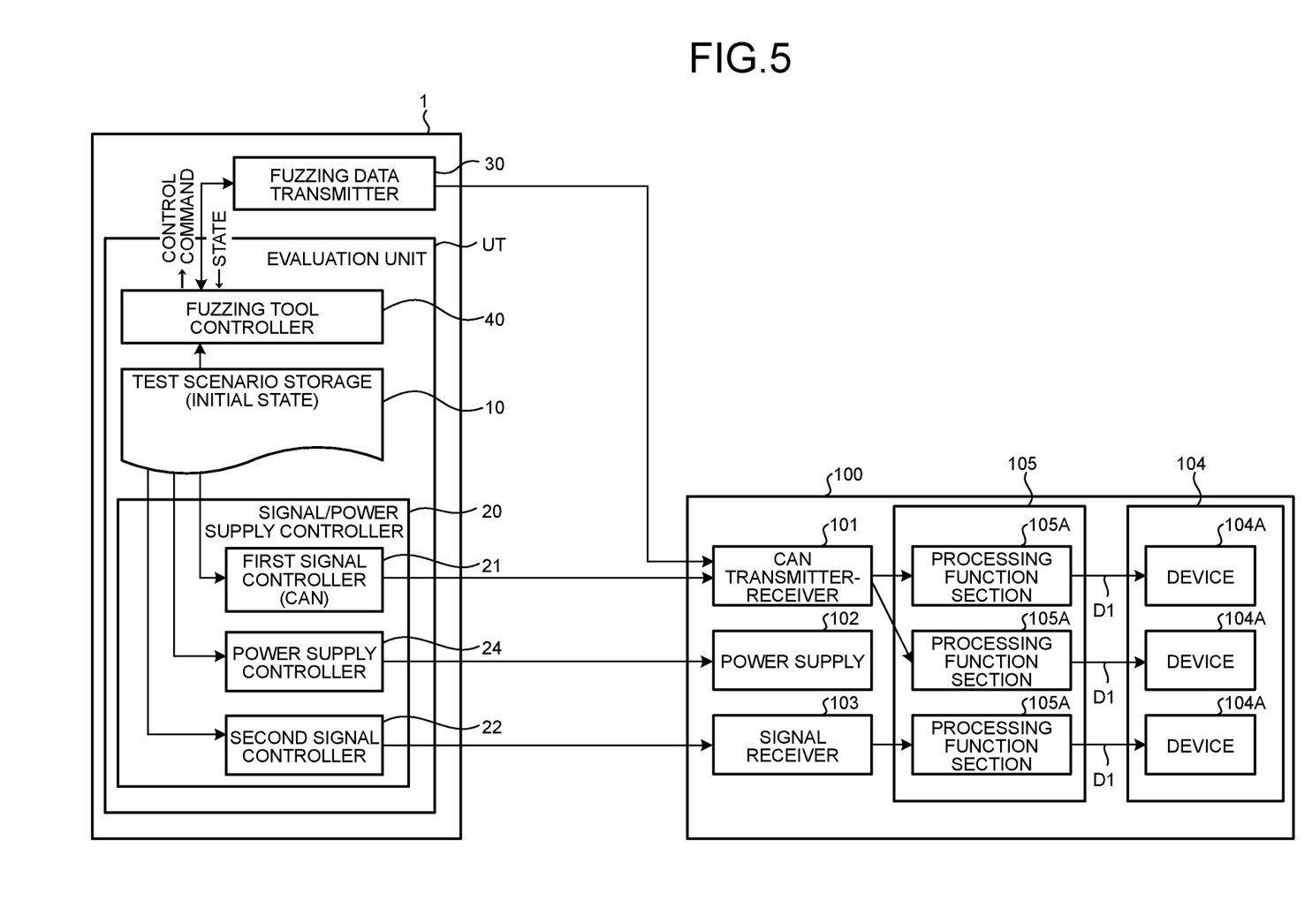
FIG. 5 is a block diagram illustrating an example of transmitting fuzzing data according to the embodiment.

Next, as illustrated in FIG. 5, the evaluation device 1 transmits fuzzing data to the meter device 100 while the operating section 104 of the meter device 100 normally operates. For example, the fuzzing data transmitter 30 transmits the fuzzing data to the CAN transmitter-receiver 101 of the meter device 100. The CAN transmitter-receiver 101 transmits the transmitted fuzzing data to the controller 105. The controller 105 transmits control signals D1 generated after the transmission of the fuzzing data to the operating section 104 to control the operating section 104. The variation detector 70 detects variation from the normal operation of the operating section 104. The evaluator 80 evaluates the vulnerability of the controller 105 on the basis of the variation detected by the variation detector 70.

Figure 6:
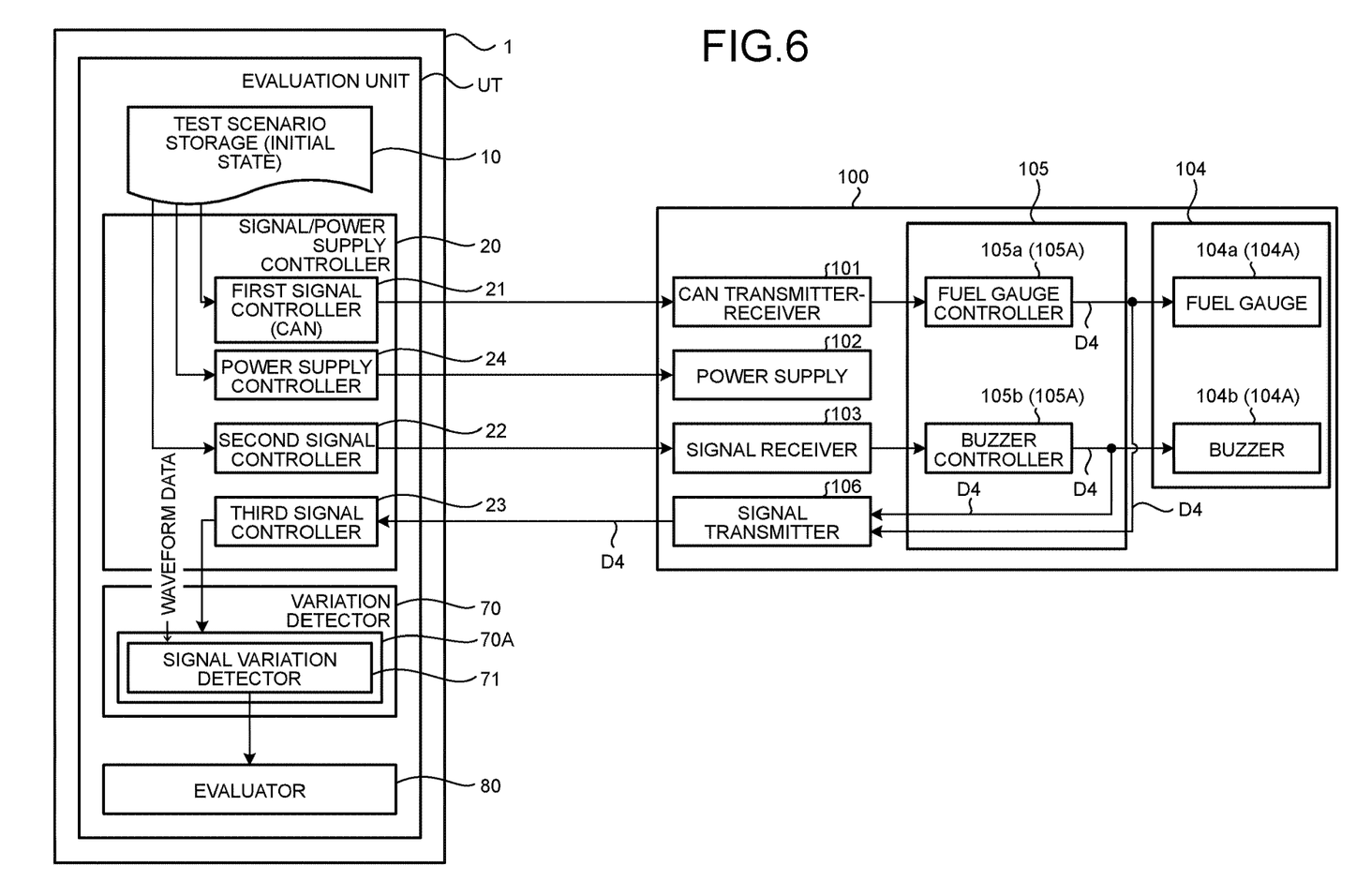
FIG. 6 is a block diagram illustrating an example of detecting variation of an internal signal according to the embodiment.

Next, evaluation processing of the evaluation device 1 will be individually and specifically described. FIG. 6 is a block diagram illustrating an example of detecting variation of the operation signal D4 according to the embodiment. In the example illustrated in FIG. 6, the device 104A is, for example, the fuel gauge 104a or the buzzer 104b, and the target is those of which the operation can be externally checked. The fuel gauge controller 105a transmits an operation signal (waveform data) D4 generated after the reception of the fuzzing data to the fuel gauge 104a to control the fuel gauge 104a. The buzzer controller 105b transmits an operation signal D4 generated after the reception of the fuzzing data to the buzzer 104b to control the buzzer 104b. The signal transmitter 106 transmits the operation signal D4 generated by the fuel gauge controller 105a and the operation signal D4 generated by the buzzer controller 105b to the third signal controller 23 of the evaluation device 1. The third signal controller 23 transmits each of the operation signals D4 transmitted from the signal transmitter 106 to the signal variation detector 71. The signal variation detector 71 detects variation of the operation signal D4 transmitted from the third signal controller 23. The signal variation detector 71, for example, detects variation of the operation signal D4 from an operation signal in the normal operation. That is, the signal variation detector 71 detects variation from the operation signal D4 at the time of the transmission of the test data when the fuzzing data is transmitted with the test data transmitted. The signal variation detector 71 transmits the detected variation of the operation signal D4 to the evaluator 80. If the signal variation detector 71 detects variation of the operation signal D4, the evaluator 80 evaluates the computer program for operating the fuel gauge controller 105a or the buzzer controller 105b as having vulnerability. On the other hand, if the signal variation detector 71 detects no variation of the operation signal D4, the evaluator 80 evaluates the computer program for operating the fuel gauge controller 105a or the buzzer controller 105b as having no vulnerability.

Figure 7:
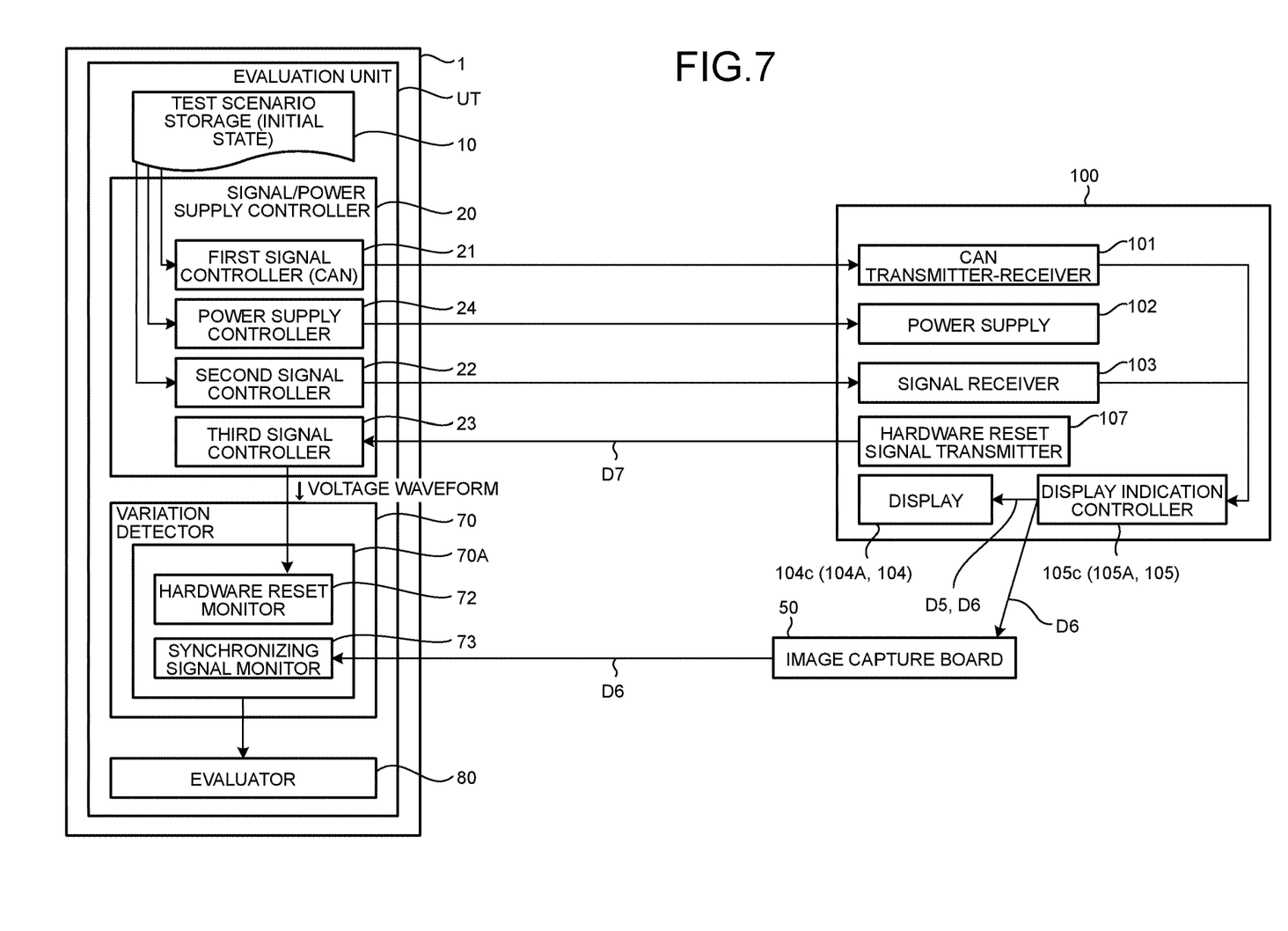
FIG. 7 is a block diagram illustrating an example of detecting variation of a hardware reset signal and a synchronizing signal for a display according to the embodiment.

FIG. 7 is a block diagram illustrating an example of detecting variation of the hardware reset signal D7 and the synchronizing signal D6 for the display 104c according to the embodiment. In the example illustrated in FIG. 7, the device 104A is, for example, the display 104c. The display indication controller 105c transmits an image signal D5 and a synchronizing signal D6 generated after the reception of the fuzzing data to the display 104c to control the display 104c. The image capture board 50 acquires the synchronizing signal D6 transmitted from the display indication controller 105c and transmits the acquired synchronizing signal D6 to the synchronizing signal monitor 73. For example, instead of transmitting all the acquired synchronizing signals D6 to the synchronizing signal monitor 73, the image capture board 50 transmits the synchronizing signal D6 to the synchronizing signal monitor 73 only if the acquired synchronizing signal D6 varies. If receiving the synchronizing signal D6 that has varied from the image capture board 50, the synchronizing signal monitor 73 transmits a signal indicating that the synchronizing signal D6 has varied, to the evaluator 80. If receiving the signal indicating that the synchronizing signal D6 has varied from the synchronizing signal monitor 73, the evaluator 80 evaluates the computer program for operating the display indication controller 105c as having vulnerability. On the other hand, if receiving no signal indicating that the synchronizing signal D6 has varied from the synchronizing signal monitor 73, the evaluator 80 evaluates the computer program for operating the display indication controller 105c as having no vulnerability.

If the hardware is reset (for example, restarted), the hardware reset signal transmitter 107 transmits a hardware reset signal D7 to the third signal controller 23. The third signal controller 23 transmits the received hardware reset signal D7 to the hardware reset monitor 72. If receiving the hardware reset signal D7, the hardware reset monitor 72 transmits a signal indicating that the hardware of the meter device 100 has been reset (for example, restarted), to the evaluator 80. On the other hand, if receiving no hardware reset signal D7, the hardware reset monitor 72 transmits no signal indicating that the hardware of the meter device 100 has been reset, to the evaluator 80. If receiving the signal indicating that the hardware has been reset from the hardware reset monitor 72, the evaluator 80 evaluates the computer program for operating the power supply 102 as having vulnerability. On the other hand, if receiving no signal indicating that the hardware has been reset from the hardware reset monitor 72, the evaluator 80 evaluates the computer program for operating the power supply 102 as having no vulnerability.

Figure 8:
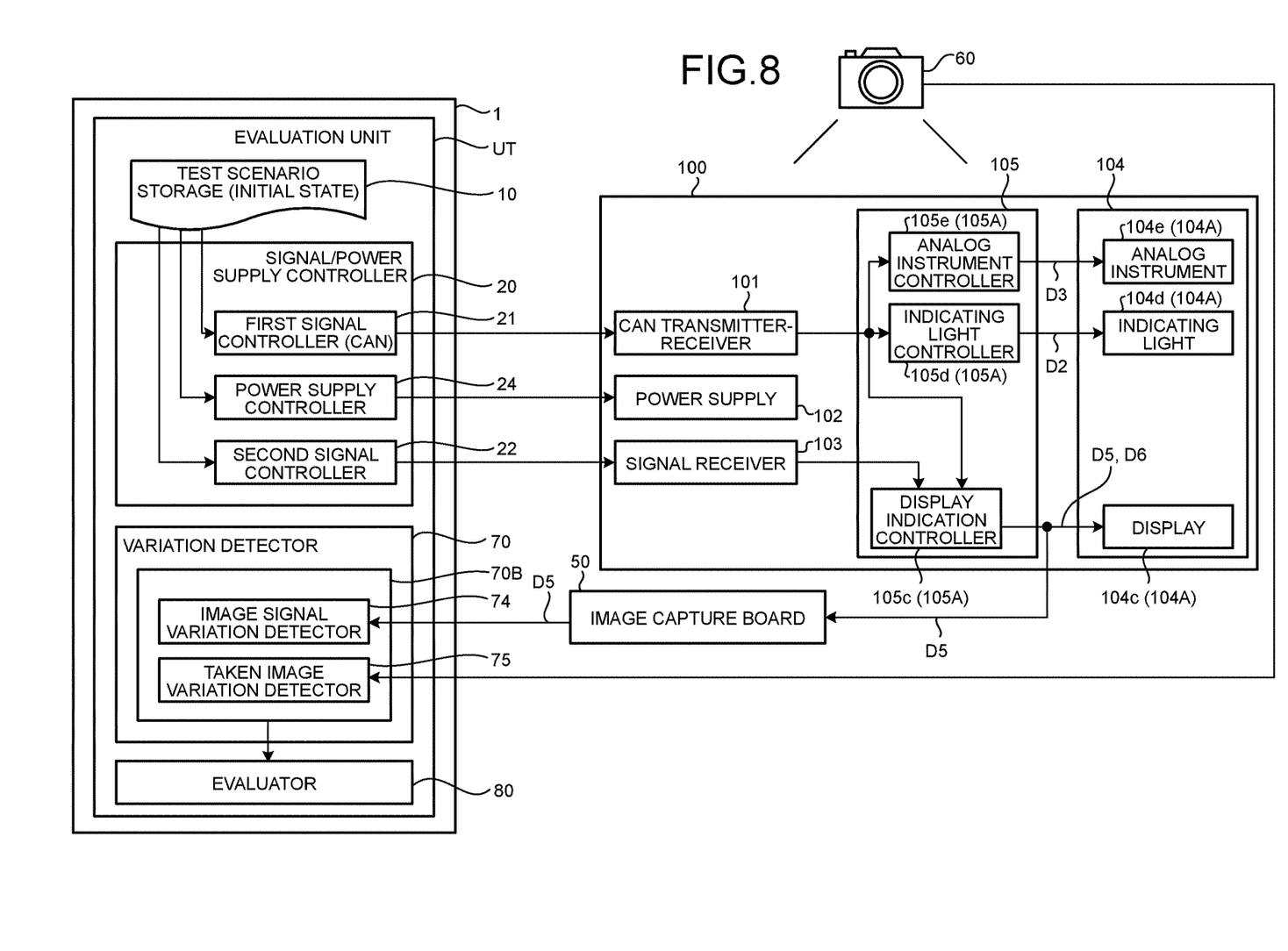
FIG. 8 is a block diagram illustrating an example of detecting variation from a visually recognizable output status in normal operation according to the embodiment.

FIG. 8 is a block diagram illustrating an example of detecting variation from the visually recognizable output status in the normal operation according to the embodiment. In the example illustrated in FIG. 8, the device 104A is, for example, the display 104c, the indicating light 104d, and the analog instrument 104e. The display indication controller 105c transmits an image signal D5 and a synchronizing signal D6 generated after the reception of the fuzzing data to the display 104c to control the display 104c. The image capture board 50 acquires the image signal D5 transmitted from the display indication controller 105c and transmits the acquired image signal D5 to the image signal variation detector 74. For example, instead of transmitting all the acquired image signals D5 to the image signal variation detector 74, the image capture board 50 transmits the image signal D5 to the image signal variation detector 74 only if the acquired image signal D5 varies. If receiving the image signal D5 that has varied from the image capture board 50, the image signal variation detector 74 transmits a signal indicating that the image signal D5 has varied, to the evaluator 80. If receiving the signal indicating that the image signal D5 has varied from the image signal variation detector 74, the evaluator 80 evaluates the computer program for operating the display indication controller 105c as having vulnerability. On the other hand, if receiving no signal indicating that the image signal D5 has varied from the image signal variation detector 74, the evaluator 80 evaluates the computer program for operating the display indication controller 105c as having no vulnerability.

The analog instrument controller 105e transmits a drive control signal D3 generated after the reception of the fuzzing data to the analog instrument 104e to control the analog instrument 104e. The camera 60 transmits a taken image (moving image) obtained by imaging the analog instrument 104e, to the taken image variation detector 75. The taken image variation detector 75 detects variation from the output status in the normal operation on the basis of variation of the taken image obtained by imaging the output status in the normal operation of the analog instrument 104e by the camera 60. For example, if detecting variation from the taken image obtained by imaging the output status in the normal operation, the taken image variation detector 75 transmits a signal indicating that the taken image has varied, to the evaluator 80. On the other hand, if detecting no variation from the taken image obtained by imaging the output status in the normal operation, the taken image variation detector 75 transmits no signal indicating that the taken image has varied, to the evaluator 80. If receiving the signal indicating that the taken image has varied from the taken image variation detector 75, the evaluator 80 evaluates the computer program for operating the analog instrument controller 105e as having vulnerability. On the other hand, if receiving no signal indicating that the taken image has varied from the taken image variation detector 75, the evaluator 80 evaluates the computer program for operating the analog instrument controller 105e having no vulnerability.

The indicating light controller 105d transmits an indication control signal D2 generated after the reception of the fuzzing data to the indicating light 104d to control the indicating light 104d. The camera 60 transmits a taken image (moving image) obtained by imaging the indicating light 104d, to the taken image variation detector 75. The taken image variation detector 75 detects variation from the output status in the normal operation on the basis of variation of the taken image obtained by imaging the output status in the normal operation of the indicating light 104d by the camera 60. For example, if detecting variation from the taken image obtained by imaging the output status in the normal operation, the taken image variation detector 75 transmits a signal indicating that the taken image has varied, to the evaluator 80. On the other hand, if detecting no variation from the taken image obtained by imaging the output status in the normal operation, the taken image variation detector 75 transmits no signal indicating that the taken image has varied, to the evaluator 80. If receiving the signal indicating that the taken image has varied from the taken image variation detector 75, the evaluator 80 evaluates the computer program for operating the indicating light controller 105d as having vulnerability. On the other hand, if receiving no signal indicating that the taken image has varied from the taken image variation detector 75, the evaluator 80 evaluates the computer program for operating the indicating light controller 105d as having no vulnerability.

Figure 9:
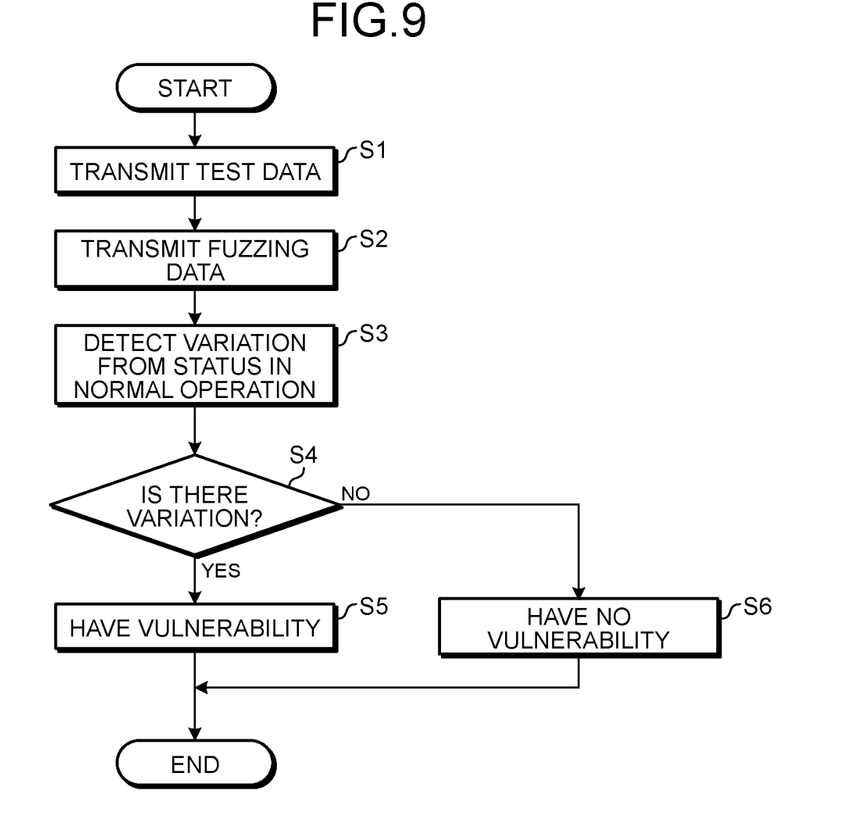
FIG. 9 is a flowchart illustrating an example operation of the evaluation device according to the embodiment.

Next, an example operation of the evaluation device 1 will be described with reference to a flowchart. FIG. 9 is a flowchart illustrating the example operation of the evaluation device 1 according to the embodiment. As illustrated in FIG. 9, in the evaluation device 1, the first signal controller 21 and the second signal controller 22 transmit the test data stored in the test scenario storage 10 to the controller 105 of the meter device 100 (step S1). Next, the fuzzing data transmitter 30 transmits the fuzzing data to the controller 105 of the meter device 100 (step S2). The fuzzing data transmitter 30, for example, transmits the fuzzing data to the controller 105 with the controller 105 normally operating the operating section 104 on the basis of the test data transmitted from the first signal controller 21 and the second signal controller 22 (step S2). At this time, the output status variation detector 70B detects variation from the output status in the normal operation being the visually recognizable output status in the normal operation of the operating section 104 (step S3). Furthermore, the internal signal variation detector 70A detects variation of the internal signals (operation signal D4, synchronizing signal D6, and hardware reset signal D7) output from the controller 105 in the normal operation of the operating section 104, from the internal signals in the normal operation, when the fuzzing data transmitter 30 transmits the fuzzing data to the controller 105 with the controller 105 normally operating the operating section 104 on the basis of the test data transmitted by the first signal controller 21 and the second signal controller 22. Next, the evaluator 80 evaluates vulnerability on the basis of the variation detected by the output status variation detector 70B and the internal signal variation detector 70A (step S4). If there is variation (Yes at step S4), the evaluator 80 evaluates the controller 105 as having vulnerability (step S5). On the other hand, if there is no such variation (No at step S4), the evaluator 80 evaluates the controller 105 as having no vulnerability (step S6).

As described above, the evaluation device 1 according to the embodiment includes the first and second signal controllers 21 and 22, the fuzzing data transmitter 30, the output status variation detector 70B, and the evaluator 80. The first and second signal controllers 21 and 22 transmit the test data for executing the normal operation of the operating section 104 to the controller 105 of the meter device 100 including the operating section 104 and the controller 105 controlling the operating section 104. The fuzzing data transmitter 30 transmits the fuzzing data being improper data differing from the data for executing the normal operation, to the controller 105. The output status variation detector 70B detects variation from the output status in the normal operation being the visually recognizable output status in the normal operation when the fuzzing data transmitter 30 transmits the fuzzing data to the controller 105 with the controller 105 normally operating the operating section 104 on the basis of the test data transmitted by the first and second signal controllers 21 and 22. The evaluator 80 evaluates the vulnerability of the controller 105 on the basis of the variation from the output status in the normal operation detected by the output status variation detector 70B.

With this configuration, if detecting no variation from the output status in the normal operation when the fuzzing data is transmitted to the controller 105, the evaluation device 1 can evaluate the controller 105 as having no vulnerability to the transmitted fuzzing data. On the other hand, if detecting variation from the output status in the normal operation when the fuzzing data is transmitted to the controller 105, the evaluation device 1 can evaluate the controller 105 as having vulnerability. The evaluation device 1 can automatically evaluate vulnerability and can reduce a load on an operator. As a result, the evaluation device 1 can properly evaluate the vulnerability of the controller 105 controlling the operating section 104 that provides output in a visually recognizable output status.

In the above-described evaluation device 1, the operating section 104 includes the first indicator 120 being the display 104c, and the second indicator 121 being the indicating light 104d or the analog instrument 104e. The output status variation detector 70B includes the image signal variation detector 74 detecting variation from the output status in the normal operation on the basis of variation of the image signal D5 that is transmitted from the controller 105 to the first indicator 120 and is for displaying the output status in the normal operation on the first indicator 120, and the taken image variation detector 75 detecting variation from the output status in the normal operation on the basis of variation of the taken image obtained by imaging the output status in the normal operation of the second indicator 121 by the camera 60. With this configuration, the evaluation device 1 can evaluate vulnerability on the basis of the image signal D5 and an imaging signal and can thus more comprehensively evaluate the vulnerability of various objects to be tested.

The above-described evaluation device 1 further includes the internal signal variation detector 70A detecting variation of the internal signals (operation signal D4, synchronizing signal D6, and hardware reset signal D7) output from the controller 105 in the normal operation and differing from the image signal D5 and the signal for controlling the second indicator 121, from the internal signals in the normal operation, when the fuzzing data transmitter 30 transmits the fuzzing data to the controller 105 with the controller 105 normally operating the operating section 104 on the basis of the test data transmitted by the test data transmitter. With this configuration, the evaluation device 1 can evaluate vulnerability on the basis of the internal signals (operation signal D4, synchronizing signal D6, and hardware reset signal D7) and can thus more comprehensively evaluate the vulnerability of various objects to be tested.

In the above-described evaluation device 1, if the output status variation detector 70B detects no variation from the output status in the normal operation, and if the internal signal variation detector 70A detects no variation from the internal signals in the normal operation, the evaluator 80 evaluates the controller 105 as having no vulnerability to the fuzzing data transmitted by the fuzzing data transmitter 30. On the other hand, if the output status variation detector 70B detects variation from the output status in the normal operation, or if the internal signal variation detector 70A detects variation from the internal signals in the normal operation, the evaluator 80 evaluates the controller 105 as having vulnerability to the fuzzing data transmitted by the fuzzing data transmitter 30. With this configuration, the evaluation device 1 can properly evaluate the vulnerability of the meter device 100.

Modifications

In the example in the above description, the output status variation detector 70B includes the image signal variation detector 74 and the taken image variation detector 75; however, no such limitation is intended. For example, at least one of the image signal variation detector 74 and the taken image variation detector 75 may be included.

The evaluation device 1 includes the internal signal variation detector 70A in the example in the description; however, no such limitation is intended. The internal signal variation detector 70A may not be included.

The vehicle-mounted device to be evaluated is the meter device 100 in the example in the description; however, no such limitation is intended. For example, a headlamp, an electron mirror, an interior light, a head-up display, or other devices may be to be evaluated.

The fuzzing data transmitter 30 may transmit the fuzzing data including the image signal directly to the display indication controller 105c of the meter device 100.

The evaluation device according to the present embodiment can properly evaluate the vulnerability of the vehicle-mounted device on the basis of variation from the output status in the normal operation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An evaluation device for testing security of a vehicle-mounted device, the vehicle-mounted device including a controller, a CAN transmitter-receiver in electrical communication with the controller, a first indicator in electrical communication with the controller, a second indicator in electrical communication with the controller, and a third indicator in electrical communication with the controller, the controller is configured to transmit a first signal to the first indicator, second signal to the second indicator, and an internal signal to the third indicator, the evaluation device comprising: a test data transmitter configured to be in electrical communication with the CAN transmitter-receiver and transmit test data to the controller via the CAN transmitter-receiver, the test data executing normal operation of the operating section, each of the first signal, the second signal, and the internal signal is based on the test data that is received by the controller; a fuzzing data transmitter configured to be in electrical communication with the CAN transmitter-receiver and transmit fuzzing data to the controller via the CAN transmitter-receiver, the fuzzing data being improper data differing from the data executing the normal operation of any of the first indicator, the second indicator, and the third indicator; a camera disposed in a position facing the second indicator, the camera is configured to image the second indicator and transmit a taken image obtained by imaging the output status in the normal operation of the second indicator; an internal signal variation detector configured to receive the internal signal that is transmitted by the controller and to detect variation of the internal signal from the internal signal in the normal operation upon transmission of the fuzzing data to the controller by the fuzzing data transmitter with the controller executing the normal operation of the third indicator based on the test data transmitted by the test data transmitter, the internal signal differing from the first signal and the second signal; an output status variation detector in electrical communication with the camera and configured to receive the taken image transmitted by the camera, and detect variation from an output status in the normal operation upon transmission of the fuzzing data to the controller by the fuzzing data transmitter with the controller executing the normal operation of each of the first indicator, the second indicator, and the third indicator based on the test data transmitted by the test data transmitter, the output status in the normal operation being a visually recognizable output status in the normal operation; and an evaluator configured to evaluate vulnerability of the controller based on the variation from the output status in the normal operation, the variation being detected by the output status variation detector, wherein the output status variation detector includes: an image signal variation detector configured to receive the first signal that is transmitted by the controller and detect variation from the output status in the normal operation based on variation of the first signal displaying the output status in the normal operation on the first indicator; and a taken image variation detector configured to receive the taken image that is transmitted by the camera and detect variation from the output status in the normal operation based on variation of the taken image obtained by imaging the output status in the normal operation of the second indicator by the camera.

2. The evaluation device according to claim 1, wherein
the vehicle-mounted device is a meter device configured to indicate information relating to a vehicle,
the first indicator being an image displaying device, and
the second indicator being an indicating light or an analog instrument, and
the third indicator being a buzzer or a fuel gauge.

3. The evaluation device according to claim 2, wherein
the evaluator is configured to evaluate the controller as having no vulnerability to the fuzzing data transmitted by the fuzzing data transmitter upon detection of no variation from the output status in the normal operation by the output status variation detector and upon detection of no variation from the internal signal in the normal operation by the internal signal variation detector, and to evaluate the controller as having vulnerability to the fuzzing data transmitted by the fuzzing data transmitter upon detection of the variation from the output status in the normal operation by the output status variation detector or upon detection of the variation from the internal signal in the normal operation by the internal signal variation detector.

4. The evaluation device according to claim 2, further comprising:
a signal controller in electrical communication with the internal signal variation detector and configured to transmit the internal signal to the internal signal variator detector, wherein
the vehicle-mounted device includes a signal transmitter in electrical communication with the controller and configured to receive the internal signal from the controller and transmit the internal signal to the signal controller.

* * * * *